_United States Patent Office_ 3,232,339
Patented Feb. 1, 1966

3,232,339
AIR OR GAS HEATING PLANT
Andor Sántha, Kecskemet, Hungary, assignor to Licencia Tal álmányokat Értékesitö Vallalat, Budapest, Hungary, a firm
Filed Oct. 4, 1963, Ser. No. 313,870
Claims priority, application Hungary, Dec. 20, 1962, SA 1,453
1 Claim. (Cl. 165—88)

This invention concerns improvements in or relating to air or gas heating plant for industrial or domestic use. At the present time from 20–30% of the annual calorie output of boiler plants escapes without being used through the chimneys. Many out-of-date boiler plants exist, which utilise fuel with only a low degree of efficiency and the continuously increasing quantity of coal of a low calorie content being burned leads to a further general decrease in the output of the boilers.

A generally known manner for the better utilisation of heat consists in pre-heating the feed water and in the use of air-heating. These methods are, however, not very economic because the utilisation of low energies demands large investments which are only very slowly amortised.

It is an object of the invention to enable air or gas heaters to be used in industry the investment costs of which are considerably lower than those of the hitherto used air heaters, as a result of which they can be economically used in any boiler plant with only a short period of amortisation. This object can be achieved by increasing the heat exchange with a corresponding decrease in cost and size as compared with known air heaters of similar output. An additional advantage of an air heater according to the present invention is that a separate fan or blower is unnecessary since such air heater serves at the same time also as a fan or blower both for the air, as well as for the flue gases.

According to the invention there is provided an air-heater plant of the type wherein in operation air to be heated flows on one side of the walls of a chamber whilst hot flue gases flow along the other side of said walls, in which said chamber comprises a rotatably mounted drum having one or more air inlets, and a plurality of radially extending pipes opening from said drum and connected to axially extending pipes spaced from said drum and carried by side plates connected to said drum, and having means for feeding flue gas into said chamber past said radial and axial pipes to a flue gas outlet, said axially extending pipes serving to deliver heated air to an outlet and as a fan or blower for the feeding of flue gases.

Figure 1:
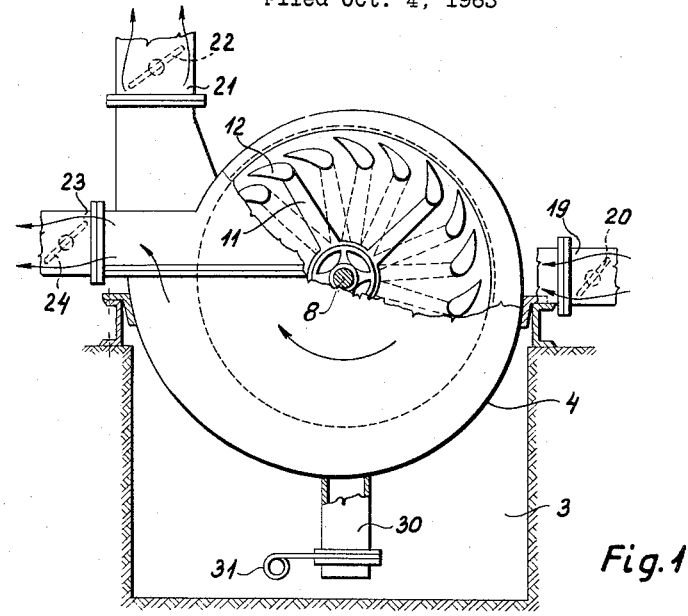
Figure 2:
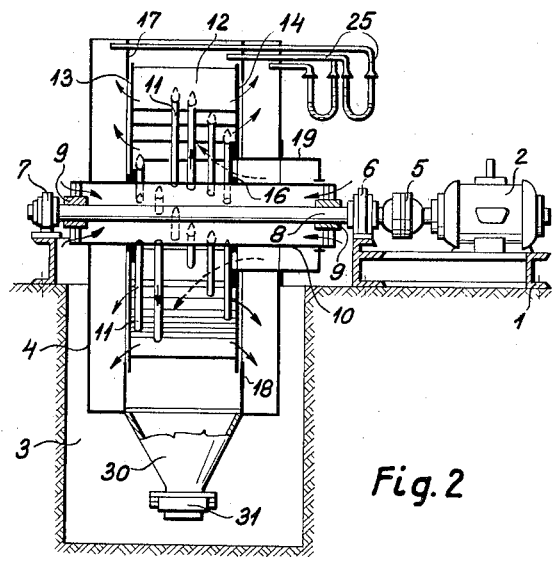

An air heater according to the invention is shown by way of example in the accompanying drawings, in which the device is shown in FIGURE 1 in a section at right angles to the shaft and partially in front elevation, and in FIGURE 2 in an axial section.

The device consists principally of the following components: 1 is the machine base which also carries an electric-motor 2 serving to drive the air heater. The machine base 1 is mounted above a concrete pit 3 which receives the part of a casing 4 of the air heater, located beneath the shaft. By means of a resilient shaft coupling 5 the electric-motor 2 drives a shaft 8 which is mounted in roller bearings 6 and 7. On the shaft 8, there is fixed by means of sleeves 9 provided with spokes, a sheet-metal drum 10, in which radially extending heat exchange pipes 11 are mounted, said pipes being uniformly distributed step wise around the drum. The pipes 11 have a streamlined cross section and are connected to axially extending, streamlined pipes 12 which are fixed in sheet-metal discs 13 and 14.

The sheet-metal discs 13 and 14 are bolted to rings 16 fixed to the drum and thus rotate in the direction— indicated by an arrow in FIGURE 1—together with the shaft, drum and pipe system. The right-hand ring 16 is provided with apertures so that the flue gases are able to flow therethrough (see dotted arrows in FIGURE 2).

The rotary sheet-metal discs 13 and 14 divide the interior of the air heater into three parts by means of stationary sheet-metal rings 17 and 18. The heated air is in the two outer narrower parts and the flue gases are in the centre space.

Between the sheet-metal discs 13 and 14 and the rings 17 and 18, there may be air gaps or any desired seal. If air gaps are provided, the pressure of the flue gases and the air has to be regulated. A throttle valve 20 provided in an inlet pipe connection on the flue gas side and a throttle valve 22 mounted in the flue gas discharge pipe 21 serve for this purpose. On the air side, a throttle valve 24 is provided in the discharge pipe connection 23.

The inflow of air to be heated which takes place at both ends of the drum 10 is, in general, not regulated.

The three spaces of the casing 4 are connected by means of tubes 25 with a manometer glass for indicating the pressure differential. An ash collector pipe 30 can be opened and closed by a flap valve 31. Baffles can if desired be provided to ensure that there is a correct distribution and flow of air in both directions along the axially extending pipes 12, since pipes 11 are not connected to the centre of pipes 12.

The device according to the invention operates as follows: by means of the resilient shaft coupling 5, the electric-motor 2 rotates the rotor of the air heater. The rotating heat-exchange pipes and streamlined conduits 11 and 12 exert a fan like action on the flue gases in their vicinity. The drawing in of the flue gases is effected in the vicinity of the shaft through the inlet pipe 19 whilst their discharge at the circumference is effected through the flue gas discharge pipe 21. The particles of the flue gases pass over the walls of the heat-exchange pipes 11 and 12 at high speed, transmitting a large number of calories thereto.

Substantially the same operation takes place with the fresh air. Each pipe of the rapidly rotating pipe system sucks in the fresh air through the ends of drum 10. The air flows towards the apertures with a fast and turbulent movement along the walls of the pipes whereby the heat transfer coefficient is considerably increased.

Dependent on conditions, the warmed air flows into the side spaces, from where it flows out through the discharge pipe 23. The high speed, turbulent, which take place on both sides of the pipe walls make it probable that the heat transfer coefficient $k$ which in a known air heater made from cast iron was about 11 kcal./m.$^2$°C.h., will be increased to 60 kcal./m.$^2$°C.h. and even more. If it is further taken into consideration that the device always works with clean surfaces, since the centrifugal force removes the deposits and ash from the heat exchange surfaces, and furthermore that no separate fans or blowers are necessary, it is apparent that the calories saved are obtained for a much lower expenditure than hitherto.

The coloured columns of liquid in the manometers connected to the tubes 25, indicate the pressure differential between the fresh air chambers and the flue gas chambers. If the warm air produced is directly used for the heating of workshops, offices or flats, the throttle valves—as also shown in the drawing—should be so adjusted that on the fresh air side there is a pressure higher by several mm. on the water column so that no contaminating flue gases can pass into the fresh air.

If the fresh air is used for industrial purposes, e.g. in furnaces or boilers for forced-draft, the control can be so adjusted that the pressure is the same on both sides.

The pipes 12 are so constructed that in spite of their streamlined shape, the spaces between them are of uniform cross section.

What I claim is:

In a heat exchanger, the combination comprising an axially rotatable drum, means for axially rotating said drum, a housing surrounding said drum, a pair of axially spaced plates secured to said drum for rotation therewith, said plates being located within said housing to define a first chamber between one of said plates and said housing, a second chamber between said plates, and a third chamber between the other one of said plates and said housing, a plurality of radially extending pipes each axially extending pipe being secured to and communicating with one of said radially extending pipes at the other end thereof, the opposite ends of said axially extending pipes being secured to said axially spaced plates, said axially extending pipes communicating with said first and third chambers, inlet means for introducing gas to be heated into said drum, outlet means for said gas communicating with said first and third chambers, inlet means for introducing hot flue gas into said second chamber around said pipes, and outlet means for hot flue gas communicating with said second chamber, whereby hot flue gases are induced to flow about said radially and axially extending pipes in said second chamber under the impeller action of the external surfaces of the rotating axially extending pipes.

References Cited by the Examiner

UNITED STATES PATENTS

| | | | |
|---|---|---|---|
| 1,828,799 | 10/1931 | Carlson | 165—110 X |
| 2,402,307 | 6/1946 | Vannerus | 165—88 |
| 2,596,622 | 5/1952 | Vannerus | 165—88 X |

FOREIGN PATENTS

| | | |
|---|---|---|
| 322,812 | 7/1920 | Germany. |

ROBERT A. O'LEARY, *Primary Examiner.*

CHARLES SUKALO, *Examiner.*